United States Patent
Liang et al.

(10) Patent No.: US 10,409,693 B1
(45) Date of Patent: Sep. 10, 2019

(54) OBJECT STORAGE IN STRIPE FILE SYSTEMS

(71) Applicant: EMC IP Holding Company LLC, Hopkinton, MA (US)

(72) Inventors: Shuang Liang, Los Altos, CA (US); Bhimsen Bhanjois, Fremont, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 13 days.

(21) Appl. No.: 15/650,393

(22) Filed: Jul. 14, 2017

(51) Int. Cl.
| | |
|---|---|
| *G06F 16/00* | (2019.01) |
| *G06F 3/06* | (2006.01) |
| *G06F 11/14* | (2006.01) |
| *G06F 16/16* | (2019.01) |
| *G06F 16/174* | (2019.01) |

(52) U.S. Cl.
CPC ........ *G06F 11/1453* (2013.01); *G06F 16/164* (2019.01); *G06F 16/1752* (2019.01)

(58) Field of Classification Search
CPC combination set(s) only.
See application file for complete search history.

(56) References Cited

U.S. PATENT DOCUMENTS

| | | | | |
|---|---|---|---|---|
| 2014/0229936 | A1* | 8/2014 | Gaonkar | G06F 9/45558 718/1 |
| 2015/0355977 | A1* | 12/2015 | Kuszmaul | G06F 11/1451 711/162 |

* cited by examiner

*Primary Examiner* — Yong J Choe
(74) *Attorney, Agent, or Firm* — Dergosits & Noah LLP; Todd A. Noah (57) ABSTRACT

A computer-implemented method for storing backup data includes receiving, by a computing system, data associated with a file to be backed up; performing, by the computing system, de-duplication on the file to remove duplicated data and to generate unique backup data; receiving, by the computing system, a file handle based on opening a block-based storage file; storing, by the computing system, a metadata container in the block-based storage file stripe aligned; and storing, by the computing system, a data container in the block-based storage file stripe aligned, wherein the metadata container and the data container are associated with a set of objects, and wherein the data container includes the unique backup data.

19 Claims, 8 Drawing Sheets

| File Handle 350 | Offset 355 | Length 360 | Buffer 365 | Tag 370 |

OBJECT STORAGE IN STRIPE FILE SYSTEMS

BACKGROUND

Enterprises generate and store increasingly vast amounts of data. For security and protection against data loss, techniques may be used to store these vast amounts of data in secondary or backup storage devices. A backup storage device may be implemented using a storage array such as Redundant Array of Independent Disks (RAID), a data storage virtualization technology that combines multiple physical disk drive components into a single logical unit for the purposes of data redundancy, performance improvement, or both. A disk in a RAID may be referred to as a member. Typically, the member disks are low cost disks. Different RAID levels may be used. The backup storage may be considered as local storage. Recently, there is a trend to use object-based storage due to its ability to scale and store large amounts data.

DETAILED DESCRIPTION

Embodiments of the present invention may enable a block-based file system to support object storage. The block-based file system may receive a file to be backed up. A file handle and an offset may be used to generate an object identifier. A metadata container may be stored in a block-based storage stripe aligned using the handle and the offset. A data container may be stored in the block-based storage stripe aligned using the handle and the offset. The storing of the metadata container and the data container is performed using an existing storage layer associated with the block-based file system.

Some embodiments of the invention may be related to a computer-implemented method for storing backup data that includes receiving, by a computing system, data associated with a file to be backed up; performing, by the computing system, de-duplication on the file to remove duplicated data and to generate unique backup data; receiving, by the computing system, a file handle based on opening a block-based storage file; storing, by the computing system, a metadata container in the block-based storage file stripe aligned; and storing, by the computing system, a data container in the block-based storage file stripe aligned, wherein the metadata container and the data container are associated with a set of objects, and wherein the data container includes the unique backup data.

Some embodiments of the invention may be related to a system that may include a processor-based application stored on a non-transitory computer-readable medium, which when executed on a computer, will cause one or more processors to receive data associated with a file to be backed up; perform de-duplication on the file to remove duplicated data and to generate unique backup data; receive a file handle based on opening a block-based storage file; store a metadata container in the block-based storage file stripe aligned; and store a data container in the block-based storage file stripe aligned, wherein the metadata file and the data file are associated with a set of objects, and wherein the data container includes the unique backup data.

Some embodiments of the invention may be related to a computer program product, comprising a non-transitory computer-readable medium having a computer-readable program code embodied therein to be executed by one or more processors, the program code including instructions to receive data associated with a file to be backed up; perform de-duplication on the file to remove duplicated data and to generate unique backup data; receive a file handle based on opening a block-based storage file; store a metadata container in the block-based storage file stripe aligned; and store a data container in the block-based storage file stripe aligned, wherein the metadata file and the data file are associated with an object, and wherein the data container includes the unique backup data.

In general, in a block-based file system, files may be split into evenly sized blocks of data, each with its own address. A block in the block-based file system may not be associated with any metadata so there may not be any information that describes the block. In an object-based file system, all the data of a file is stored together in an object. Besides the data, the object may also store metadata about the file and a unique object identifier. An object may be identified using its unique object identifier.

Figure 1A:
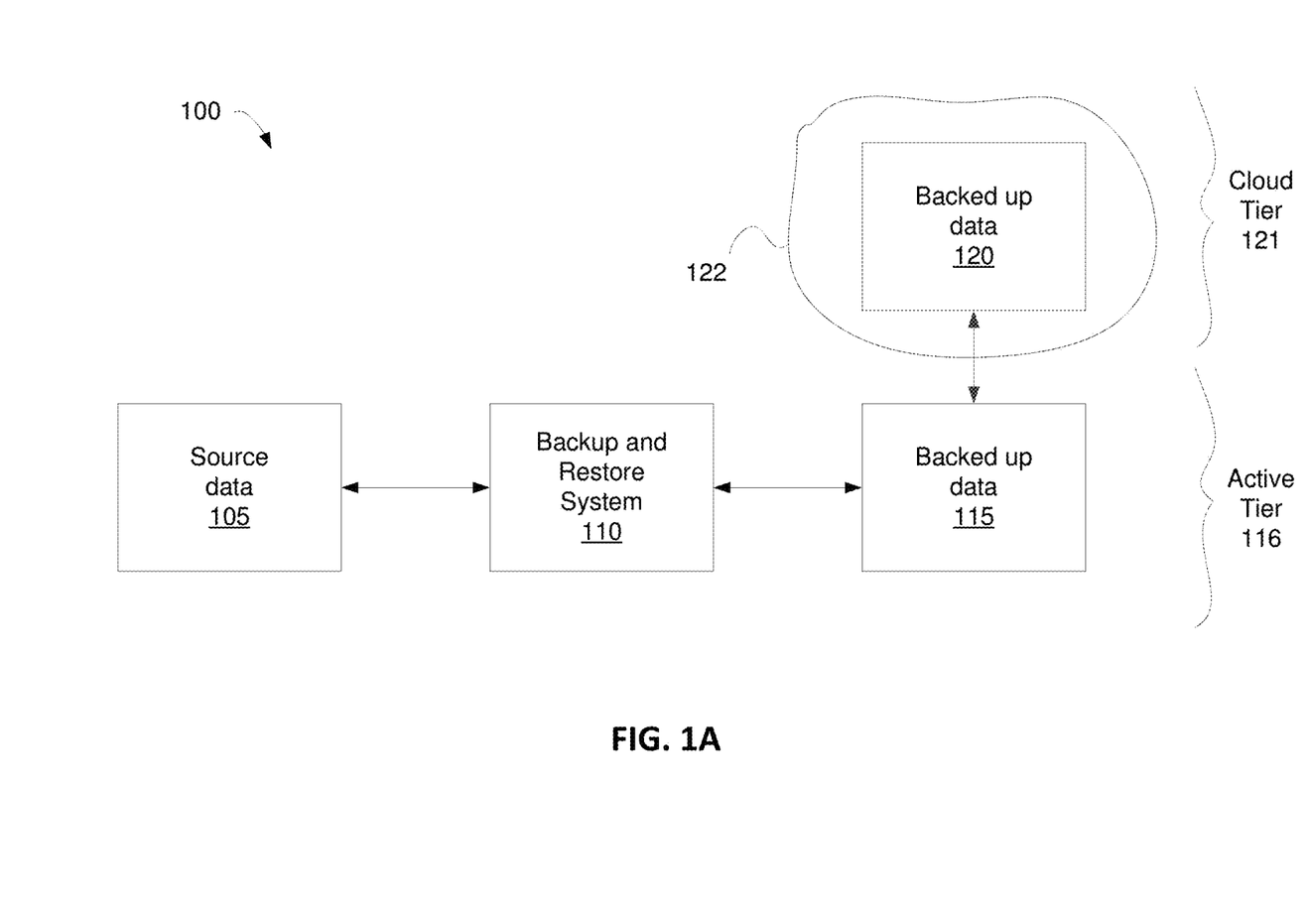
FIG. 1A shows an example overview of a generic backup and restore system, in accordance with some embodiments.

FIG. 1A shows an example overview of a generic backup and restore system, in accordance with some embodiments. In diagram 100, a backup and restore system 110 is configured to perform backup operations to backup source data 105 and store it as backed up data 115. During a backup operation, the source data105 may be copied to a backup storage device. It is possible that the source data 105 may include duplicate data. Although not shown, the source data 105 may be associated with multiple virtual machines (VM), each associated with one or more disks. The backed up data 115 may include daily incremental backup data and weekly full backup data. Depending on the implementations, the backup and restore system 110 may back up the disk files associated with the VMs to one or more of the cloud-based storage 122 in the cloud tier 121 and non-cloud-based storage device (not shown) in the active tier 116.

For some embodiments, the backup and restore system 110 may be configured with a block-based file system. With a block-based file system, the backed up data 115 may be stored as blocks of data in a storage device, with each block associated with an address. An application of the backup and restore system 110 may retrieve a block of data by making a call to the address associated with the block of data. The application may decide where to place a block of data in the storage device, how to organize blocks of data, and how blocks of data are combined or accessed. A block of data may take on meaning when the application combines it with other blocks of data.

Figure 1B:
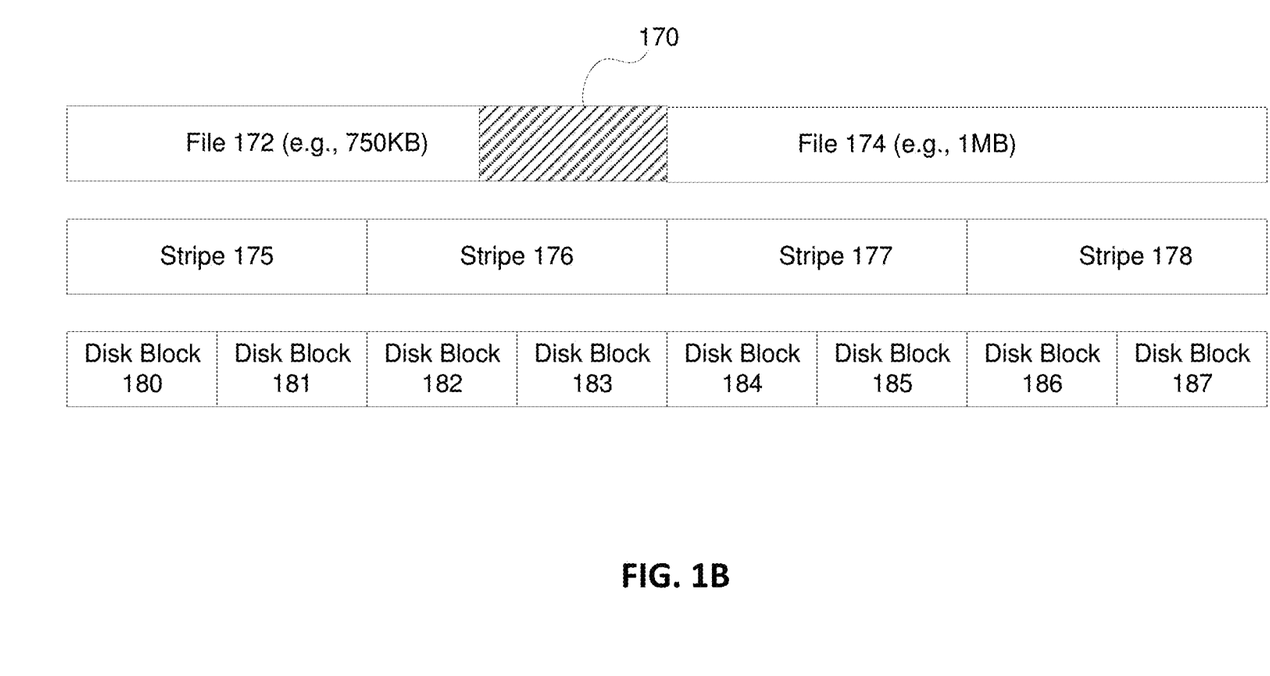
FIG. 1B shows an example of stripe alignment, in accordance with some embodiments.

FIG. 1B shows an example of stripe alignment, in accordance with some embodiments. The storage device used to store the backed up data 115 may be configured to be stripe aligned. One example of a stripe aligned storage device is the RAID which may combine multiple disks into one logical disk. In the current example, four stripes 175-178 are shown with each stripe being 512 KB in length. There are also eight blocks 180-187, with each block being 256 KB in length. With a stripe aligned storage device, offsets may be used to align write operations to stripe boundaries. This reduces the risk of writing over previously written data. For example, when file 172 (e.g., 750 KB) is written to a storage device, it may be written aligned with the stripe 175 occupying blocks 180, 181 and part of block 182. The remaining portion 170 of block 182 and block 183 may be filled with filler data by the Container Manager (shown in FIG. 2). When file 174 (e.g., 1 MB) is written to the storage device, it may be written aligned with the stripe 177 occupying blocks 184, 185, 186 and 187. The storage device used to store the backed up data 115 may be a non-cloud-based storage device. The non-cloud-based storage device may be referred to as belong to an active tier 116 (shown in FIG. 1A).

For some embodiments, the backed up and restore system 110 may be configured to store data in a cloud-based storage 122. The cloud-based storage 122 may be a service provided by cloud storage providers (CSPs) such as, for example, Amazon S3. The cloud-based storage 122 may be referred to as belong to a cloud tier or protection tier 121 (shown in FIG. 1A). Using the cloud-based storage 122 may extend the amount of data stored in the non-cloud-based storage device significantly while reducing the cost. For example, the cloud-based storage 122 may be used to store the backed up data 120. The backed up data 120 may have been migrated from a storage device in the active tier 116.

For some embodiments, the metadata used to perform the de-duplication of the source data 105 may be stored in the storage device in the active tier 116 as well as being mirrored and stored in the cloud-based storage of the cloud tier 121 so that the data is well protected. Using this approach, there are two types of data stored in the cloud-based storage 122: one is the user data, and the other is the metadata. This may mean that if the backed up data 115 is deduplicated data, the backed up data 120 is also deduplicated data.

Figure 2:
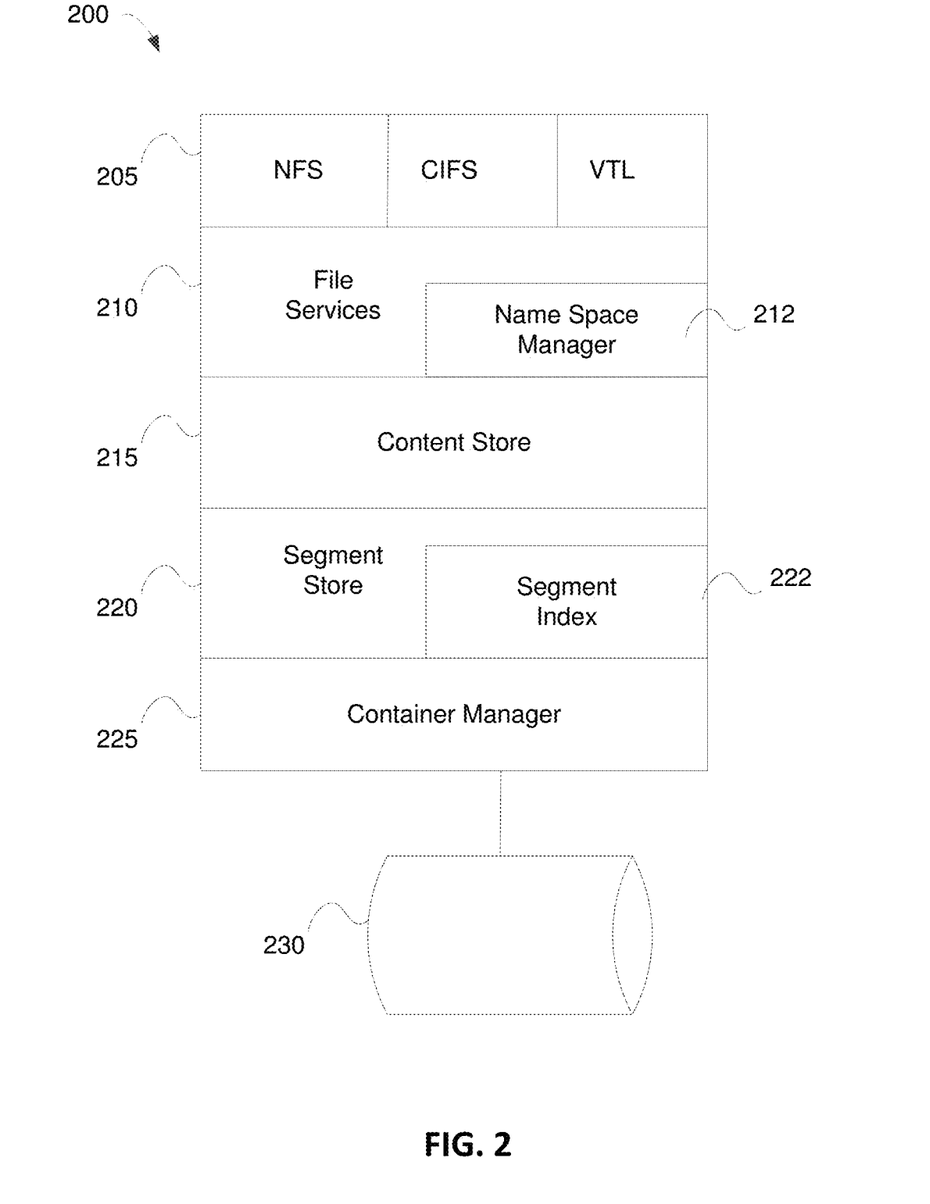
FIG. 2 shows an overview example of a backup and restore system that performs deduplication, in accordance with some embodiments.

FIG. 2 shows an overview example of a backup and restore system that performs deduplication, in accordance with some embodiments. One example of a backup and restore system 110 that may perform de-duplication operations is the EMC Data Domain Deduplication Storage System DD9800 of EMC Corporation of Hopkinton, Mass. Backup and restore system 200 is shown in this example to include a stack of software components. At the top layer 205 of the stack, the backup and restore system 200 supports multiple access protocols which are layered on a common File Services layer 210. The supported protocols include, for example, Network File System (NFS), Common Internet File System (CIFS), and a virtual tape library interface (VTL).

When a data stream enters the backup and restore system 200, it goes through one of the standard interfaces to the generic File Services layer 210, which manages the name space and file metadata 212. The File Services layer 210 forwards write requests to Content Store 215 which manages the data content within a file. The Content Store 215 breaks the data stream into segments. Each segment is associated with a finger print. The segments may be stored in the Segment Store 220.

The Content Store 215 may use the Segment Store 220 to perform deduplication of the segments. The Segment Store 220 may uniquely identify a segment using a fingerprint and then compares the segment to previously stored segments using the segment index 222. If the segment is unique, it may be stored in a container. However, if the segment is determined to be a duplicate of a segment that has already been stored, a reference is created to it and the segment isn't stored. Each segment is associated with a segment descriptor which includes at least its fingerprint. The segment index 222 may include information that maps segment descriptors to a container holding a particular segment.

The Segment Store 220 may pack unique segments into units, compresses such units using a compression algorithm to further compress the data, and then writes the compressed results into containers. A container may include a metadata section and a data section. A metadata section of a container may include the segment descriptors for the segments included in the container. A data section of a container may include user data from one or more segments. A container may have a fixed size and may be a unit of data that is written in the storage device 230. A properly sized container may enable efficient full-stripe writes. When the Segment Store 220 appends a container to the Container Manager 225, the Container Manager 225 generates a unique container ID for that container and returns the container ID to the Segment Store 220.

The Container Manager 225 is responsible for allocating, de-allocating, reading, writing and storing the containers in the storage device 230. To read a data stream from the storage device 230, a read operation is sent from an application through one of protocols of the standard interfaces at the top layer 205 and the File Services Layer 210. The Content Store 215 then uses the references to de-duplicated segments to deliver the desired data stream. The Segment Store 220 may pre-fetch, decompress, read and cache data segments from the Container Manager 225.

Figure 3A:
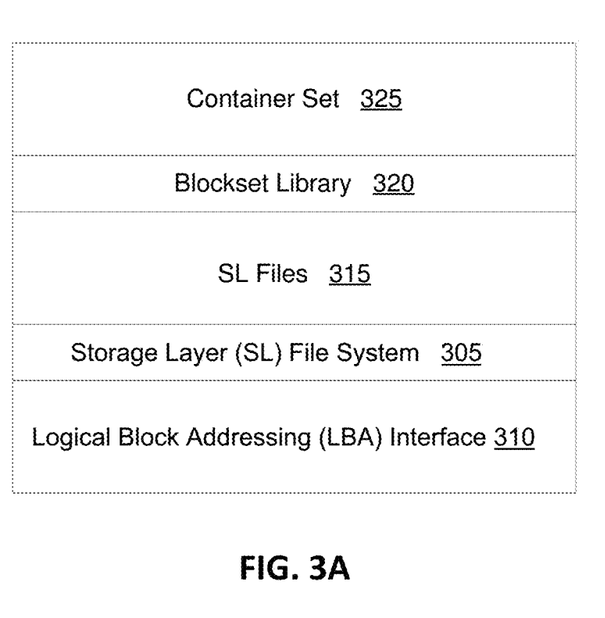
FIGS. 3A-3B show an overview example of a file system that may be used with a backup and restore system, in accordance with some embodiments.
Figure 3B:
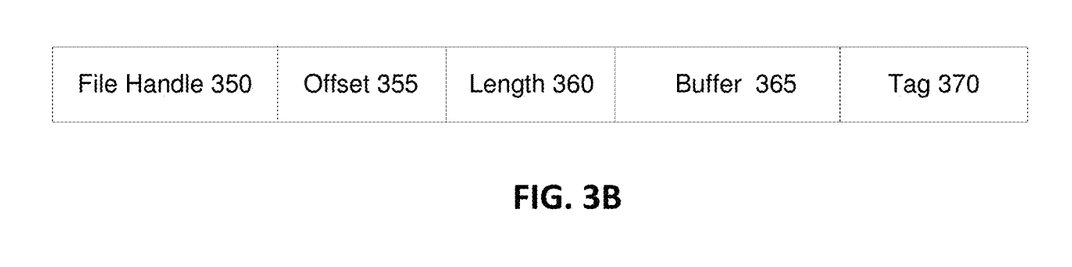

FIG. 3A shows an overview example of a file system that may be used with a backup and restore system, in accordance with some embodiments. Container set 325 may include one or more containers. For some embodiments, storage layer (SL) block files 315 may be used to store the user data and metadata. The SL block files 315 may be implemented on top of an SL file-system 305 (also referred to as SL layer) using, for example, a RAID volume (not shown) as the storage device. The SL block files 325 are used to access the volume. The volume may expose a logical block addressing (LBA) interface 310. LBA is a common scheme used for specifying the location of blocks. The SL file system 305 may use the LBA interface 310 to create the files. The Container Manager 225 (shown in FIG. 2) may be configured to write content of a container (from the container set 325) to a SL block file 325. A block storage file may be opened. A file handle may be returned. The Container Manager 225 may write to the block-based file using the file handle 350, offset 355, length 360, buffer 365 that hosts the data, and a tag 370, as shown in FIG. 3B.

Figure 4:
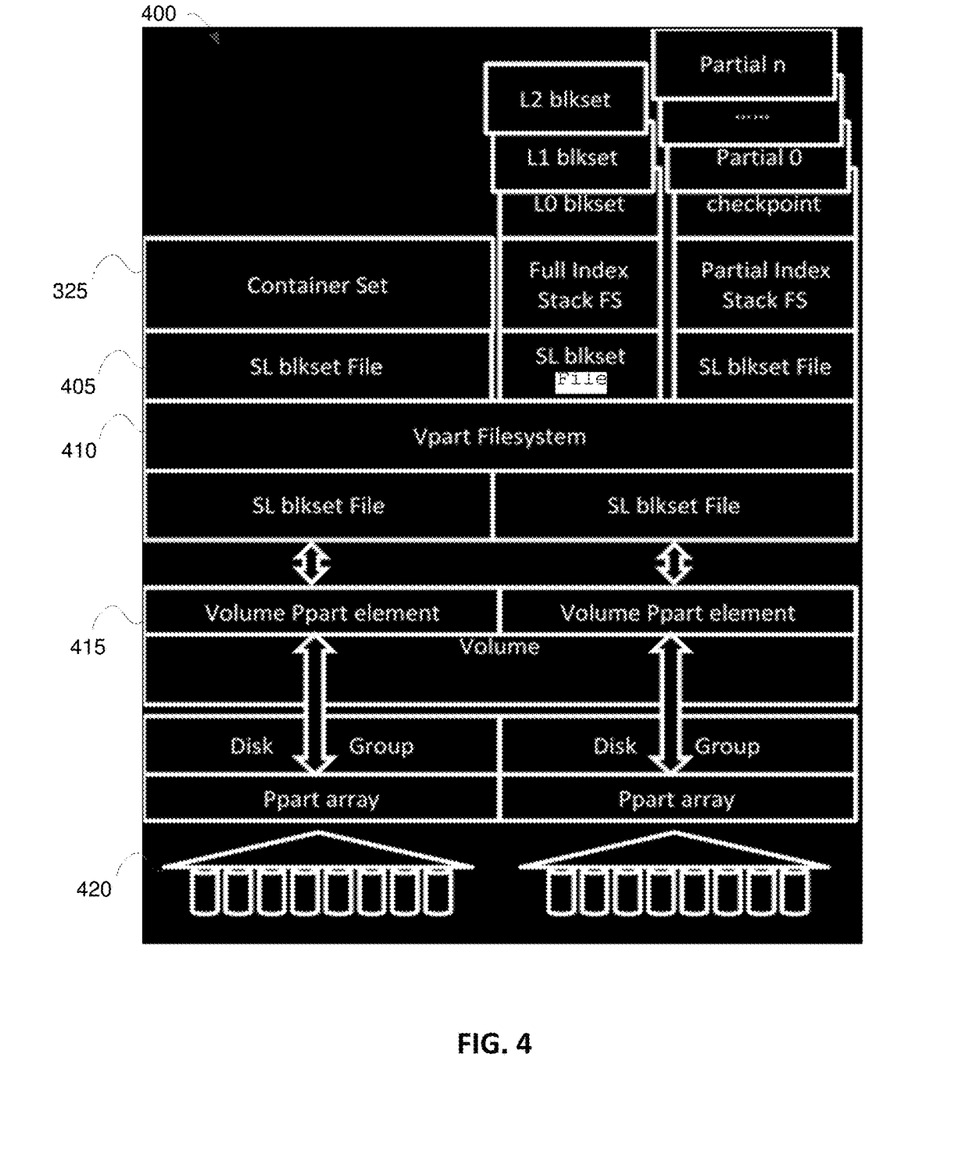
FIG. 4 shows an example of a block-based file system, in accordance with some embodiments.

FIG. 4 shows an example of a block-based file system, in accordance with some embodiments. With the file system 400, the SL file system 305 may use the blockset files 405 to do storage management. The SL file system 305 may use a blockset library to manage volume element as a set of blocks. Multiple such volume elements 415 may be used to construct the vpart file system 410. The SL block files 325 that are exposed by the vpart file system 410 may be managed using the blockset library to implement container set file, index file system and files. As shown in FIG. 4, the blockset files 405 (as part of the SL file system 305) is implemented on top of block-based volume 420.

Figure 5:
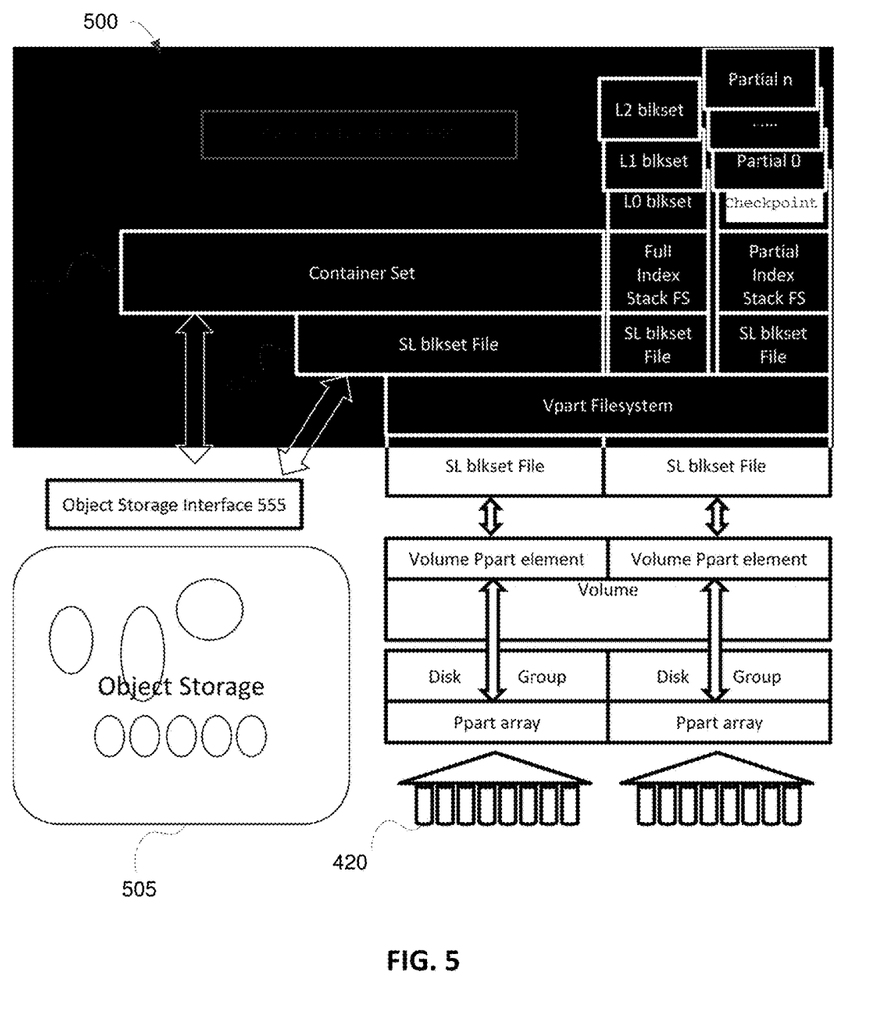
FIG. 5 shows an example of a block-based file system that may be configured to support object storage, in accordance with some embodiments.

FIG. 5 shows an example of a block-based file system that may be configured to support object storage, in accordance with some embodiments. FIG. 5 is similar to FIG. 4 except for the object storage 505 and the support of the object storage 505 by the container set 325 and the SL blockset file 425. The configuration of FIG. 5 may enable users to store data received by the file system 500 in the object storage 505 as objects without having to rewrite the lower storage layers of the file system 500. The object storage 505 may be associated with the block-based volume 420.

When the file system 500 is used for block storage, typically a file handle and an offset is used to access a file. The file system may translate that into some device with an offset to locate the blocks. With the offset and length information, the length may be divided by the stripe size and the result may be used with the offset to determine the object because they are non-overlapping. For some embodiments, the translation from the offset and the length to the object may be performed by the callback function 550.

When the data is initially received into the file system 500, deduplication may be performed to remove duplicated data. The remaining unique data may be compacted or compressed and written into a container. For block storage, the container may be mapped into one stripe on the disk and is written onto a RAID disk based on the offset. For object storage, the user data may be stored in a user data container (also referred to as LO container), and the metadata may be stored in a metadata container (also referred to as LP container). When the metadata container gets written onto the volume, it may be written to a certain offset of the associated data. When there is a need to mirror the metadata to the cloud storage, the same offset may be used, and the metadata may be written at this offset.

The content of the user data container may then be written to the object storage 505. For some embodiments, the block-based file system may use a block write interface which has a special field. The special field may allow passing a tag so that when the data is read, the tag can be used to validate the data by the storage interface. That validation may be performed in addition to, for example, a checksum validation. When the data is sent to the object storage, the object storage interface may recognize that the data is a simulated block file. The object storage interface may communicate with the callback function 255 offering the offset and the special tag. The callback function 255 may then use that information to generate an object ID.

For some embodiments, the SL blockset files 425 may be used to enable a block-based file system to support the object storage 505. This may include using an interface to the logical block addressing (LBA) interface 310 on top of the object storage 505. The SL file system 305 (shown in FIG. 3) may need to provide an interface on top of the object storage 515 to support the SL blockset. In addition, the SL file system 305 may also need to provide an object storage interface 555 which supports writing variable sized objects native to the object storage 515. The object storage interface 555 may allow the backup and restore system to use variable-sized objects directly and avoid container level copy-forward during cleaning. The object storage interface 555 may support SL blockset file emulation and provide native object storage access without changing SL interface. For the file emulation, files may be written or overwritten as multiple stripes to avoid read-modify-write cost. The blockset files may write exactly one stripe. Hence, each file stripe may be emulated using one stripe-sized object.

For some embodiments, the offset of a file may be used to name the object. For example, when using the block storage, the file stripe is mapped to a file offset and length for write I/O access. When using object storage, the offset may be used to form the object name, and the length may be used as the object size. Following is an example of an offset associated with a block-based file: cset/cont/70/-1/9437124, where "cset" is the container set, "cont" is the container, "70" is container id, and "9437124" is the offset that can be used to form the object name. It may be convenient if the objects can be listed based on stripe attributes within the file. This may require customizing the object names for categorization. Without changing the standard SL interface, the callback function 550 may be used. On each I/O, the callback function 550 may be called. The callback function 550 may map the offset of the file and the tag into an object identifier (ID). Using the offset, the callback function 550 may add additional information to the object name to categorize the object. The callback function 550 may be used to separate SL blockset metadata from the containers that are stored inside the container set 325. For some embodiments, the user (e.g., the Container Manger 225) of object storage interface555 may need to make sure that the object does not update partially in order to avoid the read-modify-read issue. For some embodiments, after opening a file, an input/output control (ioctl) may be used to set file attribute for the callback function 550.

Since the CM 225 is log structured and since the container id may be encoded into the object name, an existing object may not be overwritten except for crash recovery. For blockset metadata, it may not be read after an overwrite since it may still be in memory. Given the window between read and write is long, it may be unlikely that the inconsistency issue due to eventually consistency may arise thus reducing the risk of reading stale data.

For some embodiments, to avoid the potential issue of eventual consistency, a version may be used where version bucket is supported by the cloud storage. For each piece of data that is written, its metadata has to record a version. This is possible since the file system is log structured, and the data may not be overwritten. In the case of blockset, there is a header to track the stripes of the metadata. The header may be committed after the other dirty metadata stripes are written. Each time the header is updated, a version number is increased. When the version bucket is supported, writing an object may cause a return of a version number for each object update. The header may record the versions inside for each metadata stripes. The header object may be associated with multiple versions. When it is the first stripe to read to open the blockset, all of the object versions may be listed and read accordingly. The object with the highest version number may be used to read the rest of the metadata.

Figure 6:
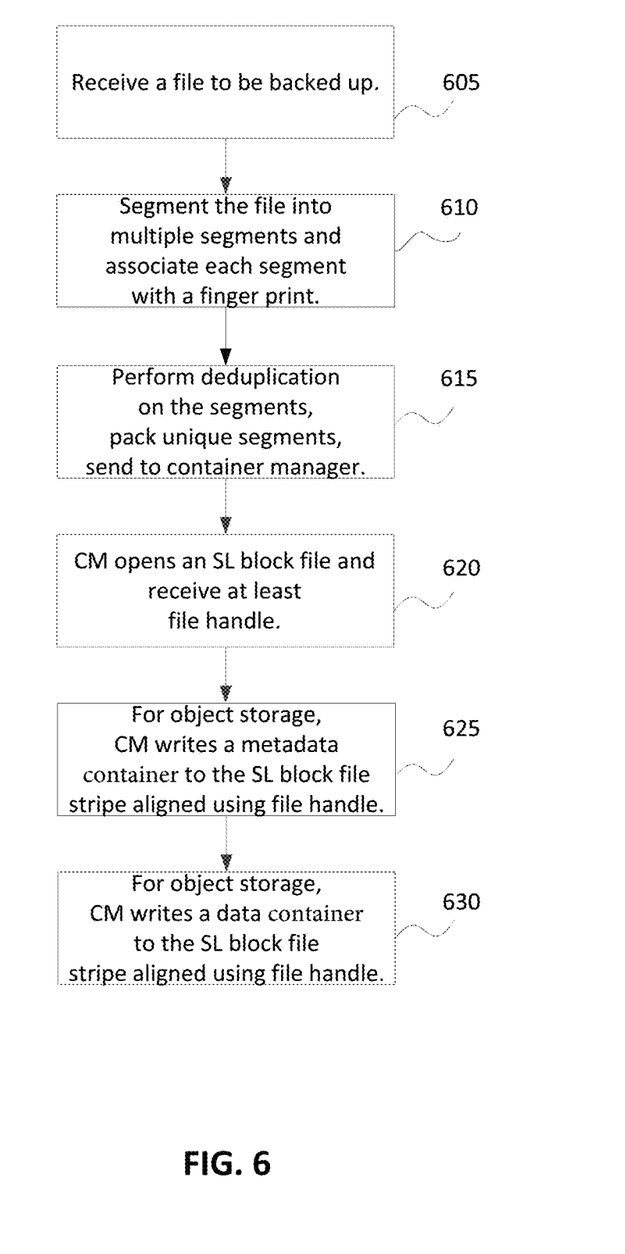
FIG. 6 is a flowchart that illustrates a method of using object storage with a block-based backup and restore system, in accordance with some embodiments.

FIG. 6 is a flowchart that illustrates a method of using object storage with a block-based backup and restore system, in accordance with some embodiments. Initially, at block 605 a file to be backed up may be received. At block 610, the file to be backed up may be segmented into multiple segments. A fingerprint may be generated based on each segment. At block 615, deduplication may be performed to generate unique segments. The unique segments may be compacted into containers, and the containers may be sent to the container manager 225.

At block 620, the CM 225 may cause a SL block file to be opened and a file handle is received in return to use for I/O operations. Alternatively, the CM 225 may cause a cloud storage file to be opened and a file handle for the cloud storage may be received. At block 625, for the I/O operation, the CM 225 may write to the metadata to the SL block file using the following format: file handle, the offset, the length, the buffer that is hosting the data, and a logical tag, as shown in FIG. 1B. An object identifier may be generated using the persistent attributes of the file such as the file name and the offset. The object identifier may be part of the metadata. The metadata container may be written like a block storage file.

To write the metadata container, the write may be stripe aligned because this is a backup system that uses RAID disks as the storage device. For example, if the RAID stripe is 1 MB, then the writes when it is received by the SL file system 305 may have the following format:

(cm_file_handle, 0, 1 MB, buffer, tag),
(cm_file_handle, 20 MB, 1 MB, buffer, tag),
(cm_file_handle, 0, 7 MB, buffer, tag).

At block 630, the data (or user data portion) of the containers (referred to as data container) may be written to the SL block file stripe aligned. The data container may be written as an object native file. Because of the stripe alignment, a new write may not overlap with a previous write, with each write associated with a different address, and there would be no address conflict. For some embodiments, when file is read, the read may pass the file handle, the offset, the length, the buffer and the tag such as, for example, cm_file_handle, 0, 1 MB, buffer, tag. Alternatively, the read operation may simply use the unique object name (e.g., file name and offset) to read the object.

For some embodiments, it may be possible to perform a partial read of an object stored in the object storage using the offset and the length. When there is a need to read part of a container, the same block storage logic may be used to translate to block storage offset and length. For example, in order to read only 0.5M, the storage layer may need to translate that to reading the object cm/0 at offset 0.5M in to that object. This translation may be performed by a call back function 550 into the object storage component (e.g., the container manager).

In addition to the offset, the callback function 550 may be configured to add other information to the object name. For example, if the file has a specific format, a metadata_tag may be added into the object name to differentiate the different formats. In another example, the container id may be added into the object name. This may enable categorizing the object by name. This may be helpful because object storage supports listing operation, and different subsets of the objects can be listed. The technique described with FIG. 5 may be used for any stack to migrate to object storage if they are originally designed for block storage, as long as they use stripe aligned writes.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   receiving, by a computing system, data associated with a file to be backed up;
   performing, by the computing system, de-duplication on the file to remove duplicated data and to generate unique backup data;
   causing, by the computing system, a block-based storage file to be opened based on the unique backup data, the block-based storage file being stripe aligned;
   receiving, by the computing system, a file handle and an offset based on the opening of the stripe aligned block-based storage file;
   storing, by the computing system, a metadata container using the file handle and the offset in the striped aligned block-based storage file; and
   storing, by the computing system, a data container using the file handle and the offset, in the stripe aligned block-based storage file, the metadata container and the data container being associated with a set of objects, and the data container including the unique backup data.

2. The method of claim 1, wherein the file to be backed up is associated with a file name.

3. The method of claim 2, further comprising generating, by the computing system, an object identifier (ID) for the object based on the file name and the offset.

4. The method of claim 3, wherein the object ID is included in the metadata container.

5. The method of claim 4, wherein said storing of the metadata container and the data container in the block-based storage file is performed based on at least the offset and a length of the file to be backed up.

6. The method of claim 5, wherein said storing of the metadata container and the data container in the block-based storage file is performed based on a stripe size of a block-based storage device.

7. The method of claim 6, wherein said storing of the metadata container and the data container in the block-based storage file is performed based on using an existing storage layer interface associated with the block-based storage device.

8. The method of claim 7, further comprising:
retrieving, by the computing system, the object from the block-based storage device based on the offset and the length and based on mapping the file name and the offset to the object ID.

9. A system comprising:
one or more processors; and
a non-transitory computer readable medium storing a plurality of instructions, which when executed, cause the one or more processors to:
receive data associated with a file to be backed up;
perform de-duplication on the file to remove duplicated data, the performing of de-duplication causing generation of a unique backup data;
cause a block-based storage file to be opened based on the generation of the unique backup data, the block-based storage file being stripe aligned;
receive a file handle and an offset based on the opening of the stripe aligned block-based storage file;
store a metadata container using the file handle and the offset in the striped aligned block-based storage file; and
store a data container using the file handle and the offset, in the stripe aligned block-based storage file, the metadata file container and the data container being associated with a set of objects, and the data container including the unique backup data.

10. The system of claim 9, wherein the file to be backed up is associated with a file name and.

11. The system of claim 10, further comprising instructions to generate an object identifier (ID) for the object based on the file name and the offset.

12. The system of claim 11, wherein the object ID is included in the metadata container.

13. The system of claim 12, wherein said instructions to store the metadata container and the data container in the block-based storage file are performed based on at least the offset and a length of the file to be backed up.

14. The system of claim 13, wherein said instructions to store the metadata container and the data container in the block-based storage file are performed based on a stripe size of a block-based storage device.

15. The system of claim 14, wherein said instructions to store the metadata container and the data container in the block-based storage file are performed based on using an existing storage layer interface associated with the block-based storage device.

16. The system of claim 15, further comprising instructions to:
retrieve the object from the block-based storage device based on the offset and the length and based on mapping the file name and the offset to the object ID.

17. A computer program product, comprising a non-transitory computer-readable medium having a computer-readable program code embodied therein to be executed by one or more processors, the program code including instructions to:
receiving, by a computing system, data associated with a file to be backed up;
performing, by the computing system, de-duplication on the file to remove duplicated data, the performing of de-duplication causing generation of a unique backup data;
causing, by the computing system, a block-based storage file to be opened based on the generation of the unique backup data, the block-based storage file being stripe aligned;
receiving, by the computing system, a file handle and an offset based on the opening of the stripe aligned block-based storage file;
storing, by the computing system, a metadata container using the file handle and the offset in the striped aligned block-based storage file; and
storing, by the computing system, a data container using the file handle and the offset, in the stripe aligned block-based storage file, the metadata container and the data container being associated with a set of objects, and the data container including the unique backup data.

18. The computer program product of claim 17, wherein the file to be backed up is associated with a file name.

19. The computer program product of claim 18, further comprising instructions to generate an object identifier (ID) for the object based on the file name and the offset, wherein the object ID is included in the metadata file.

* * * * *